Oct. 3, 1967 R. A. DEIBEL ETAL 3,344,458
WIPER ARM
Filed May 24, 1965 2 Sheets-Sheet 1
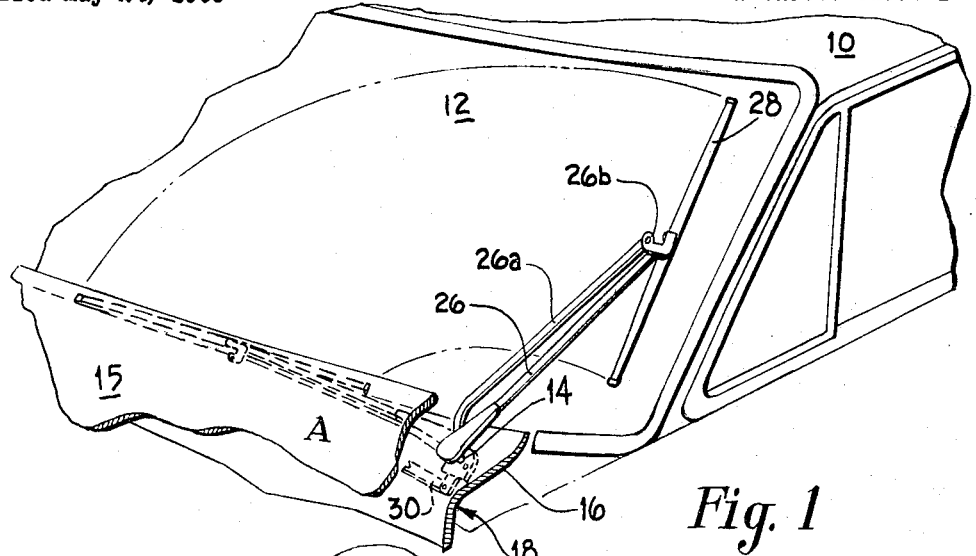
Fig. 1
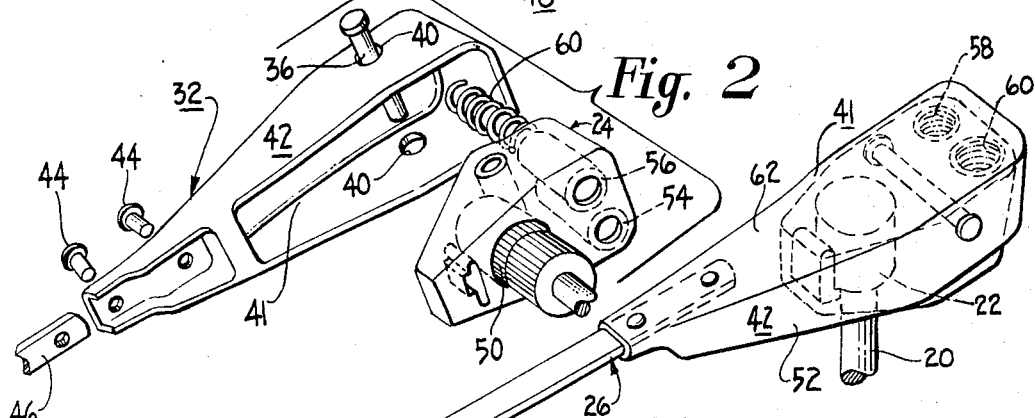
Fig. 2
Fig. 3
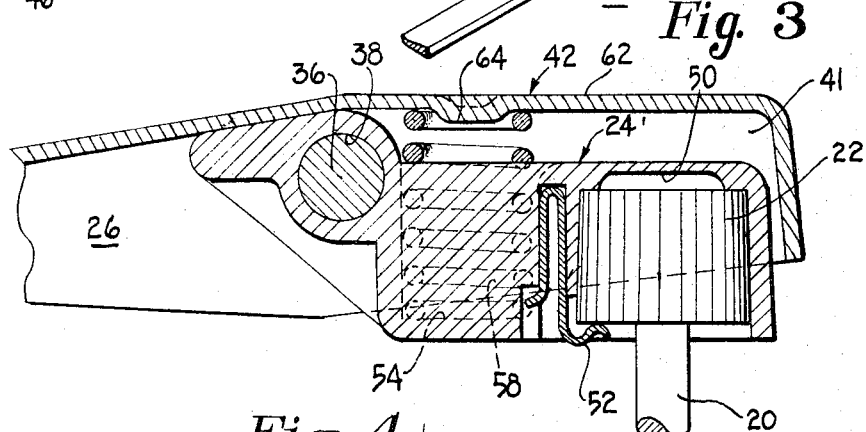
Fig. 4
INVENTOR.
RAYMOND A. DEIBEL and
WILLIAM C. RIESTER
BY
E. Herbert Liss
ATTORNEY.

Oct. 3, 1967    R. A. DEIBEL    3,344,458
WIPER ARM
Filed May 24, 1965    2 Sheets-Sheet 2
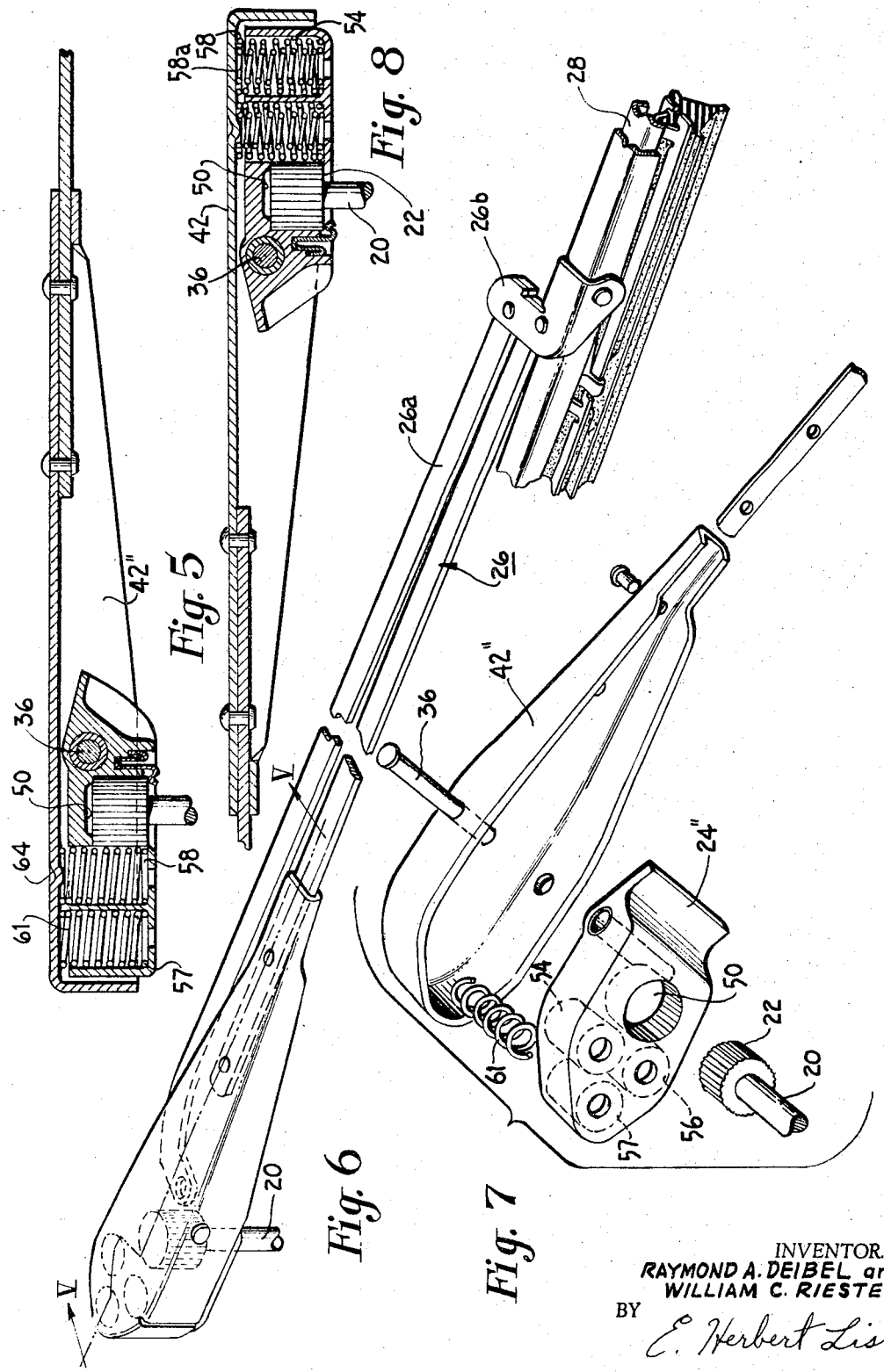
INVENTOR.
RAYMOND A. DEIBEL and
WILLIAM C. RIESTER
BY E. Herbert Liss
ATTORNEY.

3,344,458
WIPER ARM
Raymond A. Deibel, Cheektowaga, and William C. Riester, Williamsville, N.Y., assignors to Trico Products Corporation, Buffalo, N.Y.
Filed May 24, 1965, Ser. No. 458,494
2 Claims. (Cl. 15—250.35)

The present invention relates to improved windshield wiper arms and, more particularly, to a low profile windshield wiper arm for a contoured windshield wherein the arm rises and falls as it oscillates back and forth across the wiping path.

Modern automobiles are from year to year incorporating dramatic changes in styling and body design. The trend is toward concealing as much of the auxiliary equipment as possible as, for example, windshield wiper arms and blades, as well as other equipment. To provide designers with the freedom necessary to incorporate these unique appearance designs, it is essential that versatility in wiper arm mountings be available. Furthermore, to conceal wiper arms in the parked position may require the arm to pass through a small opening, necessitating a low profile arm. Furthermore, a low profile windshield wiper arm in itself constitutes a distinct advantage in design. To accomplish these unique designs in motor vehicles, it is often necessary to provide changes in the position of the arm to shaft connection, the arm to mounting head pivot point and the arm tensioning means in order to permit the wiper to function properly at the desired location and in the space available.

The tendency, too, is toward larger windshields, requiring longer arms and a companion lengthy wiping blade to clear the extended area of modern contoured glass windshields. Thus, the problem of a constant and uniform pressure on structures involving the relatively long arms and blades is magnified. This requires an arm construction having greater mechanical advantage so that smaller spring elements can be utilized, occupying less space to provide the required low profile while maintaining the higher mechanical advantage.

Arms conventionally employed on present day automobiles utilize a tension spring for providing biasing pressure to cause the blade to conform to the contoured glass. The tension spring is mounted at one end to the mounting head which is in turn pivoted to a blade carrying portion of the arm. At its other end, the tension spring is secured by suitable means at a substantial distance outwardly of the mounting head to the blade carrying portion of the arm. The spring must be housed within a large box-like spring retainer. Because of the longer arms and longer blades utilized for the large windshields of modern automobiles, both the gauge and the circumference of the helical springs employed for this purpose have become greatly increased and are sizeable. These large springs require a spring retainer or housing for the helical spring of substantial dimensions and becomes an obstacle in the effort to conceal the wiper arm or to reduce the profile.

The above mentioned problems resulting from design considerations and functional requirements are overcome by the unique wiper arm construction of this invention. In the present invention, arm pressure is produced by the use of a plurality of small compression springs located closely adjacent the pivot between the mounting head and the blade carrying portion of the arm. Because of the small displacement required at the point of applied force to produce large displacement at the blade end of the arm, short springs can be utilized. The positioning of these short springs eliminates the need for the large spring retainer used in conventional arm construction.

The principal object of the invention is to provide an improved windshield wiper arm having a low profile.

Another object of the invention is to provide an improved windshield wiper arm having a low profile and employing a leverage arrangement resulting in low friction and high mechanical advantage.

A further object of the invention is to provide an improved low profile windshield wiper arm construction to permit versatility in the relative locations of the arm tensioning means, pivot means, and arm to shaft connection while maintaining high mechanical advantage which, in turn, permits versatility in the location of the arm on the vehicle.

A still further and more specific object of the invention is to provide an improved windshield wiper arm for a contoured windshield, which arm has a low profile and wherein the blade secured to the arm is biased toward the windshield with a substantially uniform force as the blade oscillates across the contoured wiping path, the arm employing a leverage system having a high mechanical advantage.

Other objects and advantages of the invention will be apparent from the following detailed description taken in connection with the accompanying drawings in which:

FIG. 1 is a fragmentary perspective view of a motor vehicle embodying the invention;

FIG. 2 is an exploded perspective view of one modification of the invention;

FIG. 3 is a fragmentary perspective view of a wiper arm embodying the modification of the invention shown in FIG. 2;

FIG. 4 is a longitudinal cross section illustrating another modification of the invention in assembled form;

FIG. 5 is a longitudinal cross sectional view taken on line V—V of FIG. 6 looking in the direction of the arrows, showing another modification of the invention;

FIG. 6 is a longitudinal perspective view of a wiper arm embodying the modification shown in FIG. 5;

FIG. 7 is an exploded perspective view of the modification shown in FIGS. 5 and 6; and FIG. 8 is a fragmentary longitudinal cross section similar to FIG. 5, showing a further modification of the invention.

Briefly, the wiper arm assembly of this invention comprises an arm mounting head pivotally secured to a blade carrying element. The mounting head includes a recess for conveniently mounting the wiper arm on a drive shaft with suitable provision for radial adjustment. A plurality of cavities may be provided in the mounting head for retaining a plurality of arm pressure springs. A transverse opening is provided in the mounting head for journaling the mounting head on the blade carrying portion of the arm.

The plurality of parallel acting arm pressure springs permits the use of shorter, lower rate springs acting in concert to provide a force equivalent to a longer single spring. A plurality of concentric springs may be utilized in one or more of the cavities and it will be understood of course that a single cavity may be utilized for retaining a plurality of concentrically located arm pressure springs. The mounting head is located within and pivotally secured to a mounting head retainer which is a part of the blade carrying portion of the arm. The mounting head retainer overhangs the pivotal connection and overlies the spring retaining cavities thereby serving to confine the springs within the spring retaining cavities. The reaction of the springs against the mounting head retainer furnishes the arm biasing force. Since no intermediate elements are required between the springs and the mounting head or between the springs and the mounting head retainer, friction is reduced to a minimum. This reduction in friction permits the use of even shorter springs.

This construction provides a first class lever with the fulcrum being very close to the applied force. The distance between the load and the fulcrum is many, many times the distance between the fulcrum and the applied force. Therefore, a small displacement at the point of applied force results in substantial movement at the load or blade end of the arm. This arrangement enables even a further reduction in the required spring length. It is apparent, of course, that the pivot point may be located intermediate the mounting head recess and the spring cavities, that the drive shaft recess may be located intermediate the pivot and the spring cavities or that the positions of the spring cavities and the driving shaft recess may be interchanged to give extreme versatility in arm location.

Illustrated in FIG. 1 is a fragmentary view of a motor vehicle 10 having a windshield 12. A windshield wiper pivot shaft assembly 14 is mounted on a wall 16 of the plenum chamber 18 in the cowl area A. The pivot shaft assembly includes a pivot shaft 20 having a fluted drive burr 22 which carries the mounting head or mounting element 24 of a wiper arm 26. At the end of the wiper arm 26 remote from the mounting element 24, there is secured in any suitable or desirable manner a wiper blade 28. The drive shaft 20 is connected through linkage 30 to a wiper motor (not shown) of any suitable or desirable type to produce oscillation of the blade 28 on the windshield 12.

By way of example, the wiper arm of this invention is illustrated in FIG. 1 for use in a motor vehicle wherein the windshield wiper arm and blade is concealed. The hood 15 is shaped at the end adjacent the windshield so as to leave a small opening between the plenum chamber and the hood. Since the drive shaft 20 is mounted on the plenum chamber, the blades will be concealed below a slightly upturned portion of the hood 15 when in parked position. The parked position of the wiper is shown in dotted lines in FIG. 1.

The wiper arm 26 shown in FIG. 1 is of the type which includes a drag link 26a pivotally secured to a bell crank lever 26b at one end adjacent the blade and at its other end the drag link 26a is pivotally secured to a pin, not shown. The bell crank lever 26b constitutes the connector between the arm and the blade. This type of arm causes the blade to pivot relative to the arm about an axis substantially perpendicular to the windshield as the blade traverses its path in order to eliminate any unwiped area, particularly in the lower corner of a windshield which has a severe rearward slope. Although this type of arm is shown and described by way of example, it will of course be understood that in accordance with the broader aspects of this invention, other suitable or desirable types of arms may be employed.

The arm 26 includes the mounting head 24 pivotally secured to a blade carrying portion or element 32 by a pivot pin 36 received in a journal 38 extending transversely through the mounting section 24. The pivot pin 36 is retained at its ends in aligned apertures 40 located in the side walls of the mounting head retainer 42 of the blade carrying portion 32, which retainer 42 is rigidly secured as, for example, by rivets 44, to the blade carrying bar 46. The mounting section 24 is pivotally secured within the confines of a recess 41 in the box-like mounting head retainer 42.

The mounting section includes a fluted recess 50 for receiving the fluted drive burr 22. The flutes of the drive burr 22 and the flutes in recess 50 interengage in any selected radial position of the arm to prevent rotation of the arm relative to the drive burr 22. The drive burr is retained within the recess by a spring latch 52. As shown in FIGS. 2 and 3, the mounting section 24 includes a pair of cavities 54 and 56 for receiving coil compression springs 58 and 60, respectively. On the underside of the mounting section 24, the cavities have an end wall with a central aperture. This end of the cavities 54 and 56 will hereinafter be referred to as the closed end of the cavities 54 and 56. The openings in the closed end of cavities 54 and 56 provide drainage to prevent moisture from collecting within the cavities. The springs 58 and 60 seat on the closed end of the cavities 54 and 56 and extend toward the top wall 62 of the mounting head retainer 42. Thus, the springs 58 and 60 engage the top wall 62 and are retained within the cavities thereby. The reaction of the springs 58 and 60 against the top wall 62 of the mounting head retainer 42 applies a force which tends to pivot the blade carrying portion 32 about the pivot pin 36 to bias the blade against the windshield.

Since the force is applied by the springs 58 and 60 to the blade carrying portion 32 of the arm on one side of the pivot pin 36 and the load or blade end of the arm is on the opposite side of the pivot pin 36, the structure constitutes a high mechanical advantage, first class lever with the pivot pin 36 constituting a fulcrum. Depressed portions 64 are provided in the wall 62 of the mounting head retainer 42 to locate and position the springs 58 and 60. It should be noted that in the modification shown in FIGS. 2 and 3, the pivotal axis 36 is located intermediate the recess 50 and the cavities 54 and 56. This reduces the distance between the applied force and the fulcrum to a minimum, producing substantially greater displacement at the blade end of the arm than at the end adjacent the mounting head retainer when the blade carrying element 32 is pivoted about fulcrum 36. The recess 50 in FIGS. 2 and 3 is located inwardly from the fulcrum axis 36. It should be noted that the mouth of recess 50 and the closed ends of the cavities 54 and 56 are substantially co-planar and that the closed end of the drive burr recess 50 and the mouths of the cavities 54 and 56 are co-planar, thereby providing an extremely low profile mounting section. The mounting section 24 is substantially completely confined within recess 41 of the mounting head retainer 42. A substantial portion of the bulky spring retainer required to shield the arm tensioning spring in presently known windshield wiper arms is eliminated, thus providing a thin profile for substantially the entire length of the arm.

Although two cavities are shown in the FIGS. 2 and 3 modification, it will of course be understood that in accordance with the broader aspects of the invention, any suitable or desirable number of cavities and springs may be employed and that even a single cavity may be employed utilizing a plurality of concentric arm biasing springs within the single cavity and concentric springs may be employed in each of a plurality of cavities, if desired.

In FIG. 4 a modification of the invention is disclosed similar to the modification shown in FIGS. 2 and 3 and the same reference numerals are applied to identical parts. Only the mounting head or mounting section 24' is changed. The fulcrum or pivot pin 36 is relocated to a point inwardly of the biasing spring cavities 54 and 56 and the recess 50 is relocated to a position outwardly of the cavities 54 and 56 to a point adjacent the end of the arm.

The modification illustrated in FIGS. 5, 6 and 7 is similar to the FIG. 4 modification and like parts are given the same reference numerals. In this modification the mounting head 24" is altered and the mounting head retainer 42" is altered in shape to accommodate the mounting head 24'. A third spring retaining cavity 57 is provided with a third spring 61 disposed therein and the position of the spring retaining cavities 54, 56 and 57 is interchanged with the position of the drive burr recess 50 from the FIG. 4 position.

A comparison of the FIG. 3 embodiment with the FIG. 4 embodiment and the embodiment illustrated in FIGS. 5, 6 and 7 illustrates an important feature of this invention, that is, the versatility in the positioning of the biasing springs, the fulcrum and the drive burr recess. This versatility in repositioning these elements makes it possible to locate the arm in almost any position necessitated by design changes in the motor vehicle and to overcome problems arising from limited space requirements.

In FIG. 8 yet another modification of the invention is illustrated. The FIG. 8 embodiment is similar to the FIG. 6 embodiment, but utilizes only spring retaining cavities 54 and 56. The FIG. 8 modification utilizes a spring 58 and a spring 58a of smaller diameter than spring 58 disposed concentrically therewith.

In operation the drive burr 22 is oscillated by a motor, not shown, through a linkage assembly 30 which, in turn, causes the arm 26 and connected blade 28 to oscillate across a portion of the windshield 10. The blade is biased against the windshield with a force provided by the springs 58 and 60 and, in the FIG. 6 modification, spring 61, to follow the rise and fall of the contoured windshield in the path of the wiper blade. The blade 28 is biased against the windshield 10 with a uniform force because of the closeness of the biasing force to the fulcrum 36, resulting in very slight spring movement. Furthermore, because such slight movement is required and because no intervening elements are required between the spring, the mounting head retainer and the spring cavities, very little friction is encountered. This permits the use of smaller, shorter springs and facilitates ascertainment of a desired spring force.

It should now be apparent that a unique windshield wiper arm has been provided for producing a low profile blade which can be utilized where there are limited space requirements. The low profile arm overcomes interference with the operator's vision and can be employed in a design where the wipers are concealed and completely out of the driver's view. A low profile arm provides improved appearance when the wiper arm is located in a visible position. Certain specific embodiments of the invention have been described for the purpose of illustration, but it will be apparent that various modifications and other embodiments are possible within the scope of the invention. For example, other and different types of arm mounting means and blade mounting means may be employed. It is to be understood, therefore, that the invention is not limited to the specific arrangement shown, but in its broadest aspects it includes all equivalent embodiments and modifications which come within the scope of the invention.

What is claimed is:

1. A space conserving low profile motor vehicle windshield wiper arm for applying wiping pressure to a windshield wiper blade comprising a shallow arm head section of greater width than thickness including an arm head and arm head cover member including a top and side walls enveloping said arm head to substantially conceal said arm head, said arm head and arm head cover member being hingedly connected about a transverse pivot shaft, an outer arm blade carrying extension rigidly secure to said arm head cover member having its upper surface substantially coplanar with the upper surface of said arm head section, a recess for receiving an end portion of a motor driven shaft within the arm head including means for angularly adjusting the arm head on the shaft, a plurality of coil spring biasing means acting directly between said arm head and said arm head cover member, a plurality of secondary recesses within said arm head and positioned rearwardly of said pivot for receiving and anchoring said plurality of spring biasing means to provide wiping pressure to said blade through said arm head cover member, said spring biasing means disposed in counterbalanced force relationship with respect to the longitudinal axis of said wiper arm whereby the frictional resistance about the transverse pivot shaft is reduced.

2. A space conserving low profile motor vehicle windshield wiper arm according to claim 1 wherein said arm head cover member includes projections each disposed for engagement with an adjacent end of said coil spring biasing means for positioning said coil spring biasing means.

References Cited

UNITED STATES PATENTS

| | | | |
|---|---|---|---|
| 1,082,217 | 12/1913 | Vermersch | 267—8 |
| 1,371,363 | 3/1921 | Gillet | 15—250.34 X |
| 1,985,071 | 12/1934 | Baggs | 15—250.20 |
| 2,376,012 | 5/1945 | Sacchini | 15—250.20 |
| 2,589,854 | 3/1952 | Ozarowski | 15—250.35 X |
| 2,850,755 | 9/1958 | Deibel | 15—250.34 |

FOREIGN PATENTS 856,157   12/1960   Great Britain.

CHARLES A. WILLMUTH, *Primary Examiner.*